Figure 1:
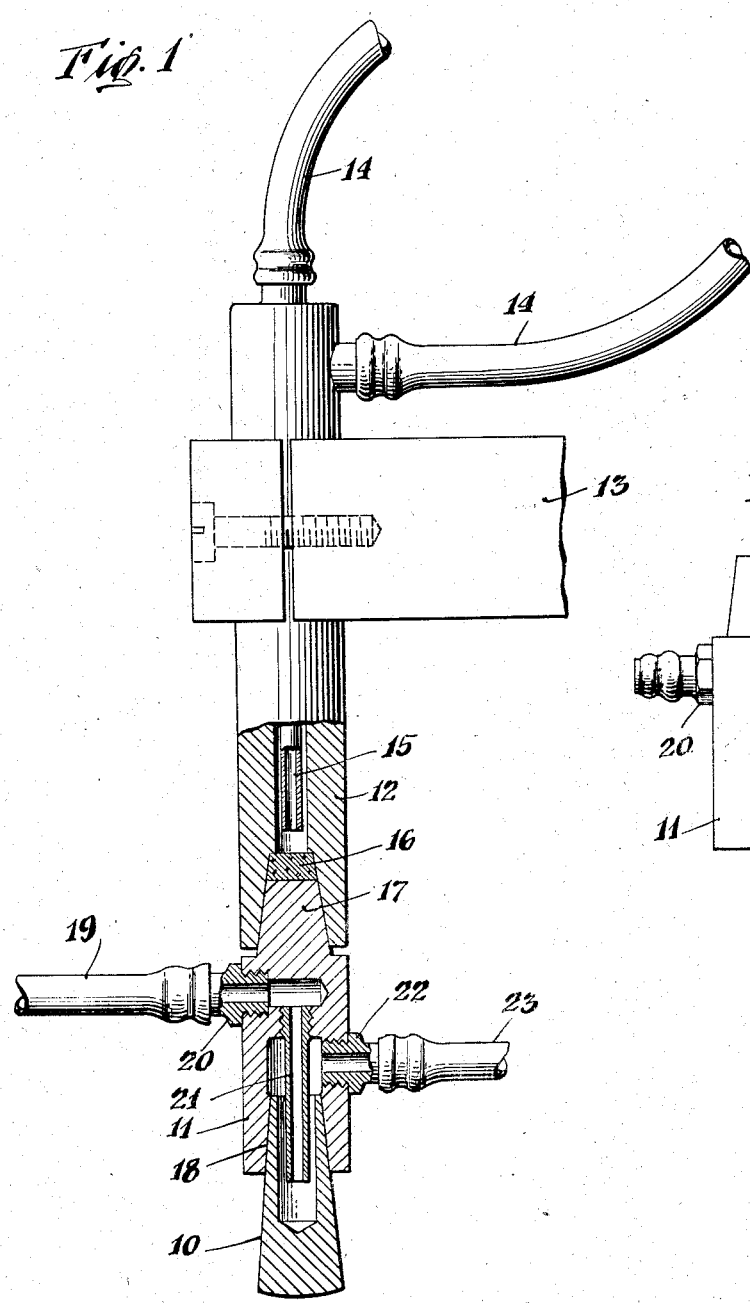

April 6, 1943. E. F. HOLT 2,315,854
WELDING ELECTRODE HOLDER
Filed March 28, 1942

INVENTOR.
Edman F. Holt
BY
Robbins & Carlson
ATTORNEYS

Patented Apr. 6, 1943

2,315,854

UNITED STATES PATENT OFFICE 2,315,854

WELDING ELECTRODE HOLDER

Edman Francis Holt, Indianapolis, Ind., assignor to P. R. Mallory & Co., Inc., Indianapolis, Ind., a corporation of Delaware Application March 28, 1942, Serial No. 436,692

4 Claims. (Cl. 219—4)

This invention relates to welding electrode holders and the cooling means therefor.

An object of the invention is to improve electrode holders and the arrangements for cooling welding electrodes.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

Figure 2:
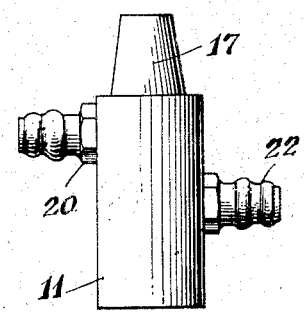

In the drawing:

Figure 1 is a side view partly in section of a welding electrode holder, an adapter therefor and a welding electrode supported thereby; and Figure 2 is a side view of the adapter.

In certain resistance welding operations such as the spot welding of aluminum and aluminum alloys, it has been found desirable to operate the welding electrodes at a substantially reduced temperature lower than that obtained with conventional water cooling. If the pressure exerting tips of the welding electrodes are maintained at a sufficiently low temperature it has been found that the tips have much less tendency to spread out or "mushroom" and less tendency to pick up metal from the work being welded. The electrical conductivity of the electrode is also thereby increased substantially, an important factor when high conductivity metals such as aluminum are being welded.

While it is desirable for greatest strength and electrical conductivity that the entire electrode supporting structure be kept reasonably cool, the improvement resulting from cooling is most marked at the pressure exerting tip of the electrode which comes in contact with the work being welded. It is, therefore, desirable to concentrate the greatest cooling effect possible at the welding tip.

If a refrigerant is circulated through a conventional welding electrode holder which is clamped in the welding arm of the machine a great deal of the cooling effect is dissipated toward the upper end of the holder and through the welding arm of the machine so as to considerably reduce the degree of cooling obtained at the welding tip and reduce efficiency of the result obtained with the refrigerating system used.

According to the present invention, a hollow electrode adapter element is attached to the end of a standard water cooled electrode holder and is provided with conduits for conveying refrigerant fluid through the adapter. Heat insulating means may also be provided between the adapter and the electrode holder to reduce the rate of heat transfer therebetween and help to concentrate the refrigerating effect at the welding electrode. The holder and part of the welding arm are thereby maintained at a temperature sufficiently low to retain their high strength and electrical conductivity while the welding electrode is super-cooled to a much lower temperature in a highly efficient manner.

Referring to the drawing the welding electrode 10 having a water cooling recess therein is fitted within tapered socket 18 of an electrode adapter member 11. The adapter 11, illustrated separately in Figure 2, comprises a hollow tubular body closed at the upper end and having hose connecting nipples 20 and 22 screwed into the body thereof to convey refrigerant fluid such as refrigerated brine solution from supply hose 19 through the adapter to return hose 23. A short tube 21 axially located within the adapter serves to convey the refrigerant into the hollow of the welding electrode.

The closed upper end of adapter 11 is provided with a tapered plug connector 17 adapted to be fitted within the tapered recess at the lower end of water cooled electrode 12. Holder 12 comprises a hollow tubular shank which is clamped at the end of arm 13 of the welding machine and has cooling water supply and return hoses 14 connected to it at its upper end. The water supply hose is attached to a small tube 15 mounted within the bore of holder 12 to carry the cooling water to the lower end of the holder. A plug 16 of insulating material such as cork, is fitted within the tapered recess at the lower end of holder 12 to produce a certain amount of thermal insulation between adapter 11 and holder 12 so that the adapter may be operated at a temperature substantially lower than that of the cooling water in the holder.

In operation, the holder 12 may be supplied with cooling water in the usual manner such as water having a temperature of about 20° C. The adapter 11 is supplied with refrigerated brine solution at a much lower temperature such as —30 or —40° C., or even lower. According to an alternative mode of operation, the outlet tube 23 leading from the adapter may be connected by an adjustable 3 way valve with the inlet tube 14 for the electrode holder so that a portion of the brine solution after it has left the adapter, may be circulated through the holder to effect whatever degree of cooling is necessary to maintain the mechanical strength and conductivity of the holder and welding arm.

It is also contemplated that in some instances, by using high pressure tubing for hoses 19 and 23, the adapter 11 may be made part of the fluid expansion passages of a compressor or absorption type refrigerating system using ammonia gas, Freon or the other similar refrigerant.

It will be obvious that threaded male or female connections may be used instead of the tapered connections shown between the adapter and the electrode and the electrode holder.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A pressure exerting welding electrode support comprising, in combination, a hollow tubular holder adapted to be clamped to the arm of a welding machine and conduits leading to and from said holder for circulating cooling fluid therethrough, a hollow adapter supported on the end of said holder and conductively in contact therewith and conduits leading to and from said adapter for circulating cooling fluid therethrough independently of circulation through said holder, said adapter having an electrode supporting portion formed therein to receive a welding electrode in current and heat conducting contact therewith, and thermal insulating material between the hollow portion of said holder and said adapter to retard heat flow therebetween.

2. A welding electrode adapter for supporting a welding electrode in a welding electrode holder comprising a hollow tubular body having a closed end and an open end, the closed end thereof being tapered to fit a tapered socket in a holder, the open end being formed with a tapered socket for receiving the tapered shank of a welding electrode, and fluid inlet and outlet tubes leading into and out of the hollow portion of said adapter through the tubular body wall thereof.

3. A welding electrode adapter for supporting a welding electrode in a welding electrode holder comprising a hollow tubular body having a closed end and an open end, said closed end being tapered to fit a tapered socket, said open end having a tapered socket to receive a tapered welding electrode shank and fluid inlet and outlet tubes attached to the body of said adapter and communicating with the hollow interior thereof.

4. A pressure exerting welding electrode support compising, in combination, a hollow tubular metal holder adapted to be clamped to the arm of a welding machine and conduits leading to and from said holder for circulating cooling fluid therethrough, the hollow in said holder extending to one end thereof and terminating in a tapered socket, a hollow tubular adapter having a closed end and an open end with the closed end tapered and held in said tapered socket, the open end of said adapter terminating in a tapered socket for receiving a welding electrode, and fluid inlet and outlet tubes leading into and out of the hollow portion of said adapter through the tubular body wall thereof, and a plug of thermal insulating material in the smaller end of the tapered socket in said holder to retard heat flow between said adapter and any cooling fluid in said holder, whereby said holder and adapter may be separately and independently cooled by cooling fluids operating at different temperatures.

EDMAN FRANCIS HOLT.